(12) United States Patent
Urbanec et al.

(10) Patent No.: US 11,442,471 B2
(45) Date of Patent: Sep. 13, 2022

(54) FLIGHT GUIDANCE CONTROLLER INTERFACE

(71) Applicant: HONEYWELL INTERNATIONAL INC., Morris Plains, NJ (US)

(72) Inventors: Jan Urbanec, Stara Lubovna (SK); Carlos Eduardo Viana Ribeiro, Anthem, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 312 days.

(21) Appl. No.: 16/859,540

(22) Filed: Apr. 27, 2020

(65) Prior Publication Data

US 2021/0333806 A1 Oct. 28, 2021

(51) Int. Cl.
*G05D 1/10* (2006.01)
*B64C 13/04* (2006.01)
(Continued)

(52) U.S. Cl.
CPC .......... *G05D 1/101* (2013.01); *B64C 13/042* (2018.01); *B64C 13/16* (2013.01); *B64D 43/00* (2013.01); *G01C 23/00* (2013.01)

(58) Field of Classification Search
USPC .......................................................... 701/7
See application file for complete search history.

(56) References Cited

U.S. PATENT DOCUMENTS 5,703,774 A * 12/1997 Houck ................. G05B 19/106
701/14
8,330,732 B2  12/2012 Nutaro et al.
(Continued)

FOREIGN PATENT DOCUMENTS

| CN | 109131907 A | 1/2019 |
| EP | 3276441 A1 | 1/2018 |
| EP | 3492298 A1 | 6/2019 |

OTHER PUBLICATIONS

NLR, "Use of Touch Screen Display Applications for Aircraft Flight Control," Feb. 2018.
(Continued)

*Primary Examiner* — Tyler D Paige
(74) *Attorney, Agent, or Firm* — Lorenz & Kopf, LLP (57) ABSTRACT

Methods and systems are provided including a flight guidance controller interface. The flight guidance controller interface includes a rotatable knob including a rotatable element disposed around a periphery of a touch control display. A graphical presentation is output on the touch control display including a plurality of sections. The plurality of sections includes an indication of respective functions of an automatic flight control system. A touch input is received to one of the plurality of sections, thereby activating control of a corresponding one of the respective functions of the automatic flight control system. A rotation input to the rotatable element is received, thereby providing information about a value for the corresponding one of the respective functions of the automatic flight control system. The information about the value is output to the automatic flight control system so that the automatic flight control system can responsively control aircraft trajectory while maintaining/honoring selected target references and values.

20 Claims, 6 Drawing Sheets

(51) Int. Cl.
*B64C 13/16* (2006.01)
*G01C 23/00* (2006.01)
*B64D 43/00* (2006.01)

(56) References Cited

U.S. PATENT DOCUMENTS

| | | | |
|---|---|---|---|
| 8,493,240 B1* | 7/2013 | Carrico | G08G 5/0047 |
| | | | 340/964 |
| 9,132,913 B1 | 9/2015 | Shapiro et al. | |
| 9,616,993 B1 | 4/2017 | Shapiro et al. | |
| 10,108,189 B2 | 10/2018 | Figard et al. | |
| 10,252,814 B2 | 4/2019 | Rudolph et al. | |
| 10,318,057 B2 | 6/2019 | Kneuper et al. | |
| 2011/0001636 A1* | 1/2011 | Hedrick | B64D 45/00 |
| | | | 340/945 |
| 2016/0062618 A1* | 3/2016 | Fagan | G06F 3/0488 |
| | | | 715/772 |
| 2016/0144716 A1 | 5/2016 | Kim | |
| 2017/0259935 A1 | 9/2017 | Hausmann et al. | |
| 2019/0310718 A1 | 10/2019 | Eraslan | |
| 2021/0333806 A1* | 10/2021 | Urbanec | G05D 1/101 |

OTHER PUBLICATIONS

Garmin, Flight Deck Solutions, Technologies and Services, Nov. 15, 2019, retrieved from https://www8.garmin.com/aviation/brochures/FD-Tech-Services.pdf.

* cited by examiner

FLIGHT GUIDANCE CONTROLLER INTERFACE

TECHNICAL FIELD

The present disclosure generally relates to user interfaces for automatic flight control systems, and more particularly relates to providing user interfaces for setting target types, attributes, target sources and target values for the automatic flight control systems of an aircraft.

BACKGROUND

Modern aircraft are equipped with automatic fight control systems which play a significant role in reduction of pilot workload during all phases of flight, from take-off to landing. Automatic flight control systems are traditionally designed to automate aircraft attitude control, in order to acquire and hold targets selected by pilots, typically via a flight guidance controller unit.

Traditionally, flight guidance controller units were designed as a collection of buttons, knobs and switches, where each knob, button and switch performed only a single function to contribute to select the target, target type or to trigger engagement of automatic flight control modes. For example, a heading knob s used to specify a target heading. An Omni Bearing Selector (OBS) knob is used to specify a target course. Knobs on a flight guidance control panel can be used to enter assigned altitudes, vertical speeds, heading, course (CRS), speed, flight path angle/pitch angle.

The traditional designs require customizations for different cockpit installations to be performed via hardware changes to the flight guidance controller unit. Further, the traditional designs necessitate a large number of electronic parts and movable elements, such as knobs, buttons or switches. The large number of parts impacts upon reliability of the flight guidance controller as a single unit and therefore the dispatchability of the aircraft, cost of maintenance of the aircraft and maintainability in general.

Accordingly, it is desirable to provide flight guidance controller interfaces that reduce the number of parts and increase customizability, whilst maintaining or improving upon functionality and usability. It is also desirable to provide methods, systems, and aircraft systems utilizing such flight guidance controller interfaces. Furthermore, other desirable features and characteristics of the present invention will be apparent from the subsequent detailed description and the appended claims, taken in conjunction with the accompanying drawings and the foregoing technical field and background.

BRIEF SUMMARY

Methods and systems are provided including a flight guidance controller interface. The flight guidance controller interface includes a rotatable knob including a rotatable element disposed around a periphery of a touch control display. A graphical presentation is output on the touch control display including a plurality of sections. The plurality of sections includes an indication of respective functions of an automatic flight control system. A touch input is received to one of the plurality of sections, thereby activating control of a corresponding one of the respective functions of the automatic flight control system. A rotation input to the rotatable element is received, which provides information about a value for the corresponding one of the respective functions of the automatic flight control system. The information about the value is output to the automatic flight control system so that the automatic flight control system can responsively set the corresponding one of the respective functions based on the value. Activating control of a corresponding one of the respective functions causes guidance target setting to be active to dial or predial the target that will only be followed when the respective autoflight mode becomes engaged. Engagement of the autoflight mode may or may not by achieved by using the touch interface. The information about the value may be signal representing a magnitude of turning and direction of turning of the rotatable element. Furthermore, other desirable features and characteristics of the systems and methods will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The present disclosure provides a flight guidance controller interface including a touch control display. The touch control display is included in a rotatable knob, as a replacement for one or more flight guidance controller units. A single rotatable knob is able to perform selection of different target parameters. Multiple different parameters may be selected and a value for the selected parameter may be set. The touch control display presents a plurality of sections including a display of an indication of a respective target parameter. A user can select a target parameter by touching one of the plurality of sections via a front face of the rotatable knob, which is formed by a screen of the touch control display of the same rotatable knob. For example, a single rotatable knob can be used to control a plurality of vertical target parameters (e.g. vertical speed target, altitude target and flight path angle target) by selecting the respective section displayed through the touch control display to activate control of that target parameter. Turning the rotatable knob will change a value of the selected target parameter.

In one example, the touch control display is graphically divided into three sections including an upper section dedicated to show a currently active/selected target parameter such as target altitude (ALT). Turning the rotatable knob will then change the target value of the target altitude (in this example). A step size of an increment or decrement of the target altitude will be dependent on a selection made through the touch control display. For example, swiping to the right in the upper section (e.g. the upper half) of the touch control display will cause the step size to be increased (e.g. 1000 ft.) whereas swiping to the left will cause the step size of one knob click to be decreased (e.g. 100 ft). Colors of all display features on the touch control display are fully configurable to match a philosophy of the cockpit. To select a different target parameter, the user needs to touch the desired element on a lower section (e.g. a lower half) of the touch control display. This will cause the currently active target parameter to be replaced in the upper section with the new target parameter and turning the rotatable knob will trigger the change in, for example, vertical speed or flight path angle reference. Similar concepts can be applied to other rotatable knobs controlling different parameters or functions of an automatic flight control system.

In embodiments, flight guidance changes are sent to the automatic flight control system when made by the operator. The actual autoflight mode activation is performed by pushing the rotatable knob or physical rotatable knob movement (nudging) to the side (e.g. including upwards).

The flight guidance controller interface described herein allows for a reduction in the number of physically stressed parts, especially knobs, and allows easier customization of the controller function to fit philosophy, functionality and appearance of different aircraft cockpits. Further, the interface includes a rotatable element to set the target value of the selected target parameter so as to maintain usability of the rotatable knob in the cockpit in view of schematic similarity to traditional knobs.

Figure 1:
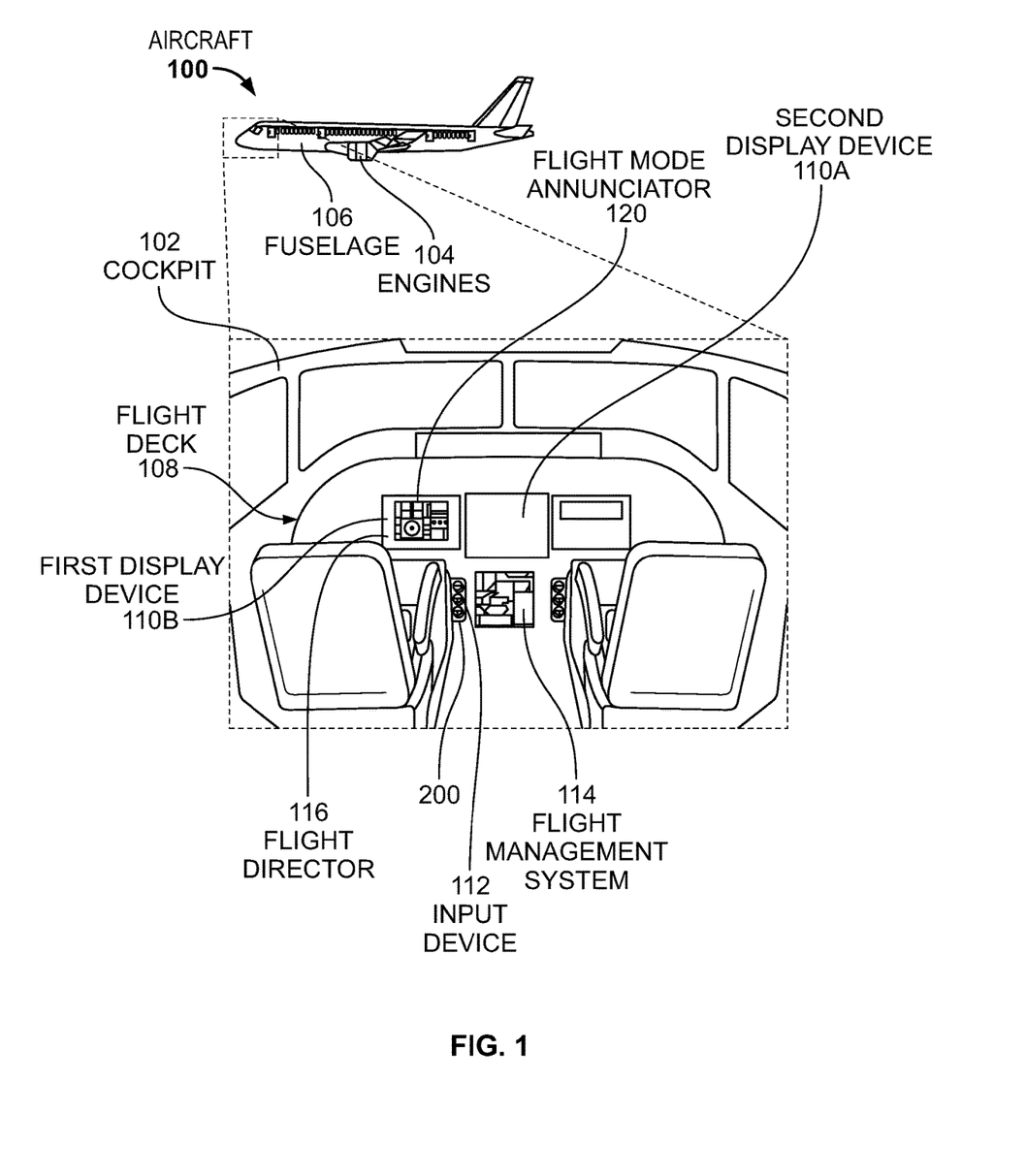
FIG. 1 is a schematic diagram of an aircraft including a flight deck, in accordance with various embodiments.

FIG. 1 depicts a perspective view of an example portion of an aircraft 100 according to example embodiments of the present disclosure. The aircraft 100 includes a cockpit 102, one or more engine(s) 104, and a fuselage 106. The aircraft 100 includes a flight deck 108, which can include one or more display device(s) 110A-B (e.g., multifunctional flight display devices) including one or more display screens. For example, the aircraft 100 can include a first display device 110A and a second display device 110B.

The aircraft 100 can include one or more input device(s) 112 (e.g., in the cockpit 102) that can be configured to provide input to one or more system(s) of the aircraft 100. The input device(s) 112 can include any device suitable to accept input from a user for interaction with the systems of the aircraft 100. For example, the input device(s) 112 can include a keyboard, joystick, multi-way rocker switches, mouse, trackball, touch screen, touch pad, data entry keys, a microphone suitable for voice recognition, and/or any other suitable device. According to the present disclosure, and with reference to FIG. 2, the input device(s) 112 includes a flight guidance controller (user) interface 200 in the form of a rotatable knob 210 having a touch control display 204 disposed therein. The rotatable knob 210 graphically presents a plurality of sections 206A, 206B including an indication of different functions or target parameters in each section. The sections 206A, 206B may be touch activated by a user to activate control of that function or target parameter. The rotatable knob 210 includes a rotatable element 202 disposed around a periphery of the touch control display 204 to set a value for the activated function or target parameter. In some implementations, the input device(s) 112 can be configured to allow the user to interact with a graphic and/or textual data element provided for display on the display device(s) 110A-B. For example, a display device (e.g., the first display device 110A) can be used to display values of a target parameter associated with the selected section 206A, 206B of the rotatable knob 210.

Referring again to FIG. 1, the aircraft 100 can include a flight management system 114. The flight management system 114 can include one or more of the input device(s) 112. The flight management system 114 can be configured to manage the flight control of the aircraft 100. For instance, the flight management system 114 can be configured to implement, manage, and/or control a flight mode, flight path, flight plan, flight trajectory, etc. for the aircraft 100. The flight management system 114 can be configured to receive input from a user. In embodiments, the flight management system 114 receives user input via the one or more input device(s) 112 including the rotatable knob 210. It should be appreciated that other user input devices are included in input device 112 than the rotatable knob 210 (such as pointer control devices, virtual or physical keyboards, joysticks and touchscreen devices) and they may be distributed throughout the cockpit 102 other than as shown in FIG. 1. Additionally, the flight management system 114 can be associated with a display device (e.g., the first display device 110A) that the user can interact with and/or that can be configured to display information associated with the flight management system 114. For example, the first display device 110A can include one or more user interfaces. The first display device 110A can include a touch display screen that can allow a user to visualize the user interface on the touch display screen and interact with the user interface (and the flight management system 114) through the touch display screen. The flight management system 114 can be configured to implement one or more flight mode(s), flight plans, etc. of the aircraft 100 selected by user input and display information associated with the one or more flight mode(s) on a display device (e.g., first display device 110A). In embodiments, a navigation function of the flight management system 114 allows a route to be programmed by a user through the input device 112 (but not necessarily by the rotatable knob 210). A flight director 116 and an auto-pilot system 402A (see FIG. 2) can steer the aircraft 100 along the desired course to an active waypoint. Deviations from the desired course to a new active waypoint are displayed on a navigation indicator. When the aircraft reaches an active waypoint, the flight management system 114 automatically sequences to the next waypoint in the route, unless waypoint sequencing is suspended.

The aircraft 100 can include a flight director 116. The flight director 116 can include one or more of the input device(s) 112 including the rotatable knob 210. The flight director 116 controls the autopilot system 402A. The flight director 116 is configured to assist in the control of the trajectory of the aircraft 100 with and/or without user (e.g., pilot) interaction. For instance, the flight director 116 can be configured to assist the aircraft 100 to operate in various control modes. For example, the flight director 116 can be configured to assist the aircraft 100 to operate in an "autonomous" control mode (e.g., no user control) and/or a "shared" control mode (e.g., some user control, some autopilot system 4020A automated control). In some implementations, the aircraft 100 can operate in a "manual" control mode by which, for example, there is limited-to-no autopilot system 402A automated control of the aircraft 100. The flight director 116 can include the first display device 110B configured to, for example, display information related to the flight director 116 (e.g., flight paths, flight plans, routes, selected flight modes, control modes, parameters associated with selected flight modes, etc.). In embodiments, one or more rotatable knobs 210 are provided to control one or more target parameters that are displayed on the first display device 110B.

In embodiments, the flight director 116 can be associated with a display device (e.g., the first display device 110A), such that the display device can display information associated with the flight director 116 (e.g., flight paths, flight plans, routes, selected flight modes, control modes, parameters associated with selected flight modes, etc.). In some implementations, the associated display device (e.g., first display device 110A) can include one or more user interface(s). For example, the first display device 110A can be operably coupled with the input devices 112 including a rotatable knob 210 such that a user can interact with the user interface (e.g., cursor interaction via trackball, mouse, etc.) and the textual and/or graphical elements included in the user interface.

The aircraft 100 can include a flight mode annunciator 120 that can be configured to inform the flight crew of a past, current, and/or future status of a Flight Director 116/Flight Guidance System/Automatic Flight Controls System For instance, the second display device 110B can be associated with the flight mode annunciator 120. The flight mode annunciator 120 can be configured to display (e.g., via the second display device 110B) one or more past, current, and/or future flight mode(s) associated with the aircraft 100, as well as other information associated with the status of the aircraft 100.

The numbers, locations, and/or orientations of the components of example aircraft 100 are for purposes of illustration and discussion and are not intended to be limiting. Those of ordinary skill in the art, using the disclosures provided herein, shall understand that the numbers, locations, and/or orientations of the components of the aircraft 100 can be adjusted without deviating from the scope of the present disclosure.

Flight guidance controller interfaces 200 included in the input devices 112 in accordance with one or more embodiments of the present disclosure will be described in more detail in reference to FIGS. 3A to 3C, FIGS. 4A to 4C and FIG. 5. The flight management system 114 and the flight director 116 and the autopilot system 402A can be stored in memory and executed by one or more computing device(s) 402, as shown in FIG. 2.

Figure 2:
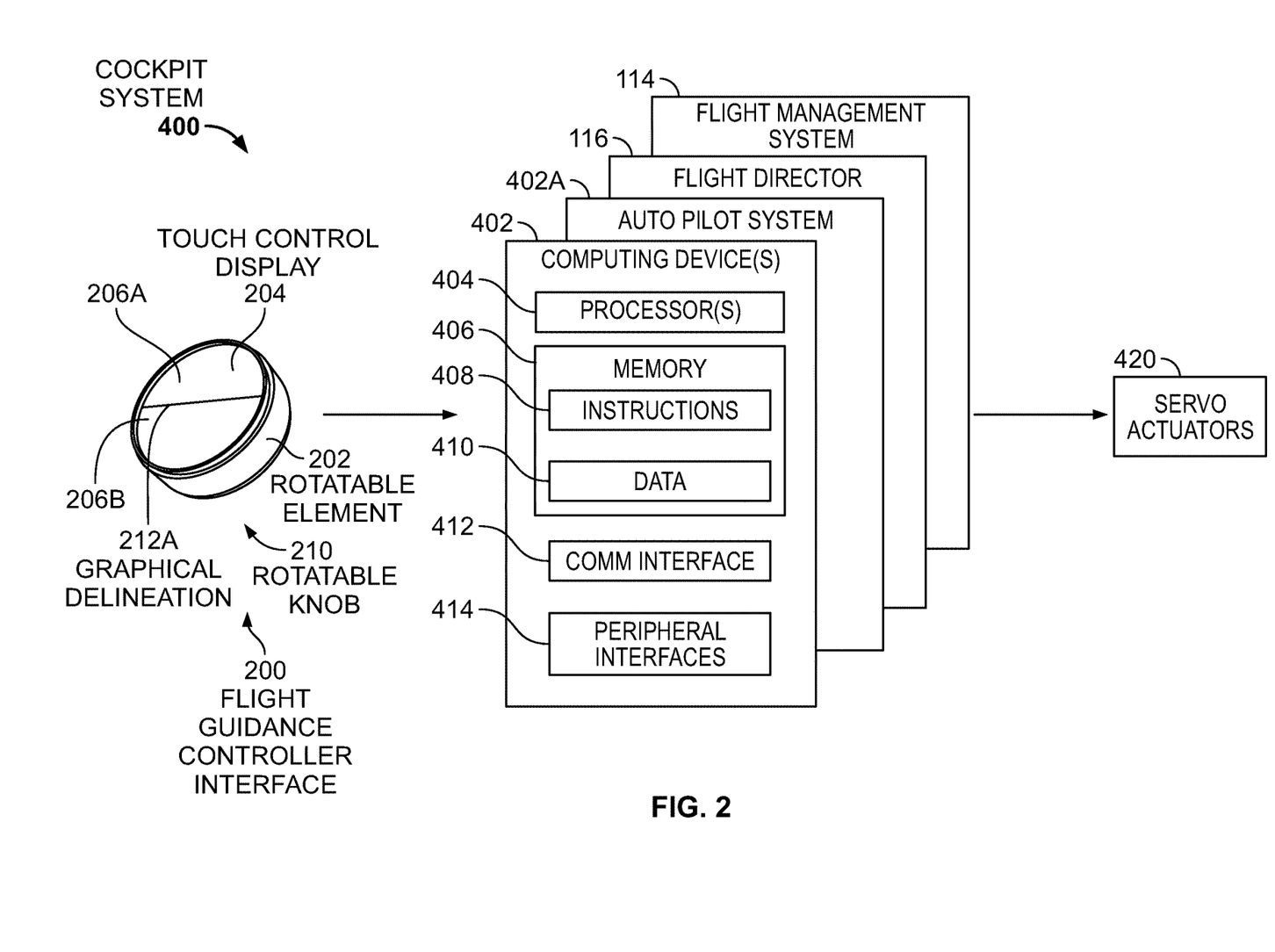
FIG. 2 illustrates a schematic block diagram of a cockpit system including a flight guidance controller interface, in accordance with various embodiments.

FIG. 2 depicts a block diagram including an example computing system that can be used to implement a cockpit system 400 or other systems of the aircraft 100 according to example embodiments of the present disclosure. In an embodiment, the cockpit system 400 includes the flight management system 114 and/or the flight director 116 and/or the autopilot system 402A. As shown, the cockpit system 400 can include one or more computing device(s) 402. The one or more computing device(s) 402 can include one or more processor(s) 404 and one or more memory device(s) 406. The one or more processor(s) 404 can include any suitable processing device, such as a microprocessor, microcontroller, integrated circuit, logic device, or other suitable processing device. The one or more memory device(s) 406 can include one or more computer-readable media, including, but not limited to, non-transitory computer-readable media, RAM, ROM, hard drives, flash drives, or other memory devices.

The one or more memory device(s) 406 can store information accessible by the one or more processor(s) 404, including computer-readable instructions 408 that can be executed by the one or more processor(s) 404. The instructions 408 can be any set of instructions that, when executed by the one or more processor(s) 404, cause the one or more processor(s) 404 to perform operations. The instructions 408 can be software written in any suitable programming language or can be implemented in hardware. In some embodiments, the instructions 408 can be executed by the one or more processor(s) 404 to cause the one or more processor(s) 404 to perform operations, such as the operations for implementing, and integrating together, the flight management system 114, the flight director 116 and the autopilot system 402A, the operations described with reference to FIG. 6 and/or any other operations or functions of the one or more computing device(s) 402. Further, the instructions 408 can be executed by the one or more processor(s) 404 to cause the one or more processor(s) 404 to perform operations to output a graphical presentation for the touch control display 204, to receive selection inputs from the touch control display 204, to receive rotation inputs from the rotatable knob 200 and to provide these inputs to the relevant application including the flight director 116 and/or the flight management system 114 for execution by the auto-pilot system 114.

The memory device(s) 406 can further store data 410 that can be accessed by the processors 404. For example, the data 410 can include a navigational database, data associated with the navigation system(s), data associated with the control mechanisms, data indicative of a flight plan associated with the aircraft 100, data associated with flight director mode selection, data associated with a flight management system, and/or any other data associated with aircraft 100, as described herein. The data 410 can include one or more table(s), function(s), algorithm(s), model(s), equation(s), etc. for navigating the aircraft 100 according to example embodiments of the present disclosure.

The one or more computing device(s) 402 can also include a communication interface 412 used to communicate, for example, with the other components of system. The communication interface 412 can include any suitable components for interfacing with one or more network(s), including for example, transmitters, receivers, ports, controllers, antennas, or other suitable components.

The one or more computing device(s) 402 can include peripheral interfaces 414. For example, the peripheral interfaces 414 can include a keyboard, joystick, multi-way rocker switches, mouse, trackball, touch screen, touch pad, data entry keys, a microphone suitable for voice recognition, a display device and/or any other suitable device. The peripheral interfaces 414 can include one or more of the flight guidance controller interfaces 200 described herein.

Continuing to refer to FIG. 2, the flight guidance controller interface 200 is shown schematically in the form of a rotatable knob 210. In embodiments, the rotatable knob 210 includes a ring shaped rotatable element 210, which has, in the present example, a knurled, or otherwise textured, outer surface for enhanced grip. The rotatable knob 210 includes a disc shaped touch control display 204 (or touch screen). The rotatable element 202 is rotatably mounted relative to the touch control display 204 such that the touch control display 204 remains stationary as the rotatable element 202 rotates around a periphery of the touch control display 204. In some embodiments, the rotatable element 202 has indexed positions, which are mechanically defined by an interface between a mount (not shown) for the touch control display 204 and the rotatable element 202. Further, the rotatable knob 210 includes a sensor for detecting a rotational movement (direction and amount) of the rotatable element 202. The sensor can be a magnetic sensor, an inductive sensor, a resistive sensor, etc.

In embodiments, the flight guidance controller interface 200 receives inputs from a user on the touch control display 204 to activate one controllable function from a plurality of controllable functions (e.g. a target parameter) of an automatic flight control system. Further, the flight guidance controller interface 200 receives an input from a user on the rotatable knob element 202 to set a value for the selected controllable function (e.g. the target parameter) of the automatic flight control system. Exemplary automatic flight control systems are the flight management system 114, the flight director 116 and the autopilot system 402A. Thus, the flight guidance controller interface 200 provides a user interface for any user settable function (e.g. target parameter) of these automatic flight control systems. The processor 404 of any one of the computing devices 402, 402A, 116 and 114 executes instructions 408 in order to receive inputs from the rotatable knob 210 and to provide outputs to the rotatable knob 210 and the automatic flight control system.

Figure 3A:
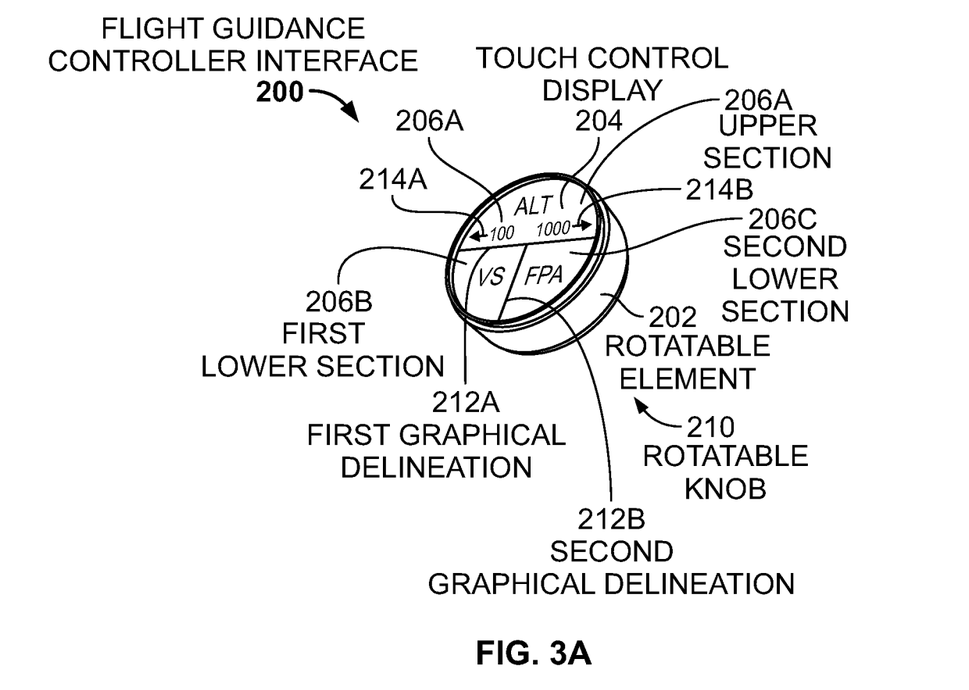
FIGS. 3A to 3C illustrate a flight guidance controller interface, in accordance with various embodiments.

In embodiments, the processor 404 generates a graphical presentation including at least two sections 206A, 206B for display through the touch control display 204. Each section 206A, 206B includes at least one indication of the controllable function of the automatic flight control system. Exemplary indications and corresponding controllable functions are described below with reference to FIGS. 3A to 3C, 4A to 4C and 5. In the exemplary embodiment of FIG. 2, there is an upper section 206A and a lower section 206B. The graphical presentation is generated such that the upper section 206A indicates the currently selected controllable function. In embodiments, the upper section 206A corresponds to an upper half of the touch control display 204. A lower half of the touch control display 204 may include one (as shown in FIG. 2) or a plurality of lower sections 206B such as two lower sections 206B, 206C (as shown in FIG. 3A, for example). A division between each section 206A, 206B is shown by a graphical delineation 212A (e.g. a graphical line).

In embodiments, user inputs are detected by the flight guidance controller interface 200 and corresponding signals are sent to the processor 404. In response to a touch selection on the touch control display 204, the processor 404 is responsive thereto to adapt the graphical presentation where necessary (e.g. by placing the selected function in the upper section 206A). In response to a rotation of the rotatable element 202, a sense signal thereof is sent to the processor 404 via the communication interface 412. In one embodiment, the processor 404 is responsive thereto by displaying a changing value of the selected target parameter on the first display device 110B or the second display device 110A. Additionally or alternatively, the processor 404 is responsive to the sensed signal of the rotation of rotatable element 202 to set a value of the target parameter in the autopilot system 402A, the flight director 116 or the flight management system 114. In embodiments, the rotatable knob must be additionally actuated in order to arm or engage a value by the automatic flight control systems. This mode engagement may be performed by pushing along a central axis passing through the face of the rotatable knob 210 or by shifting the rotatable knob perpendicularly to the central axis (e.g. upwardly, downwardly, left or right) or by touch selection through the touch control display 204. These automatic flight control systems may control one or more servo actuators 420 in order to fly the aircraft 100 according to the value of the target parameter set by the rotatable knob 210. The servo actuators 420 are responsive to commands from the autopilot system 402A (which may be set based on input from the flight management system 114 or the flight director 116) to actuate aircraft control surfaces and other aircraft features.

Although processor 404 is shown schematically in FIG. 2 as a single processor external to the rotatable knob 210, it is envisaged that distributed processor arrangements are provided in which an internal processor is also provided with respect to the rotatable knob 210. In this way, the rotatable knob 210 can be more self-contained so as to generate, by the internal processor, the touch control display 204 and output control signals representative of the touch controls and directions and magnitude of rotation of the rotatable element 202 to one or more external processors of automatic flight control systems.

Figure 3B:
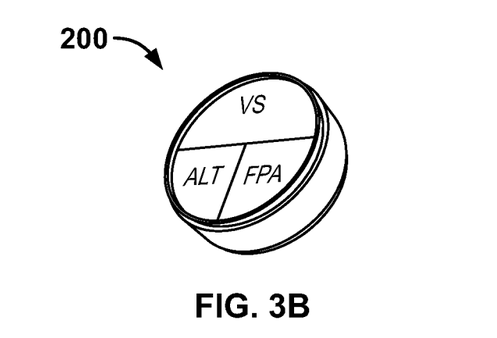
Figure 3C:
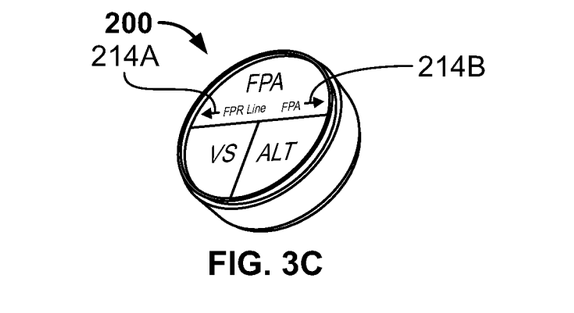

FIGS. 3A to 3C illustrate a flight guidance controller interface 200 for controlling a plurality of different vertical target parameters. The flight guidance controller interface 200 is for vertical control in the present embodiment. The touch control display 204 displays a graphical presentation including three sections including an upper section 206A and first and second lower sections 206B, 206C. The sections 206A-206C are divided by first and second graphical delineations 212A, 212B. The graphical presentation includes a graphical presentation in each section of an indication of a controllable target parameter. In the present example, the target parameters are target altitude, target vertical speed and target flight path angle, which are represented by textual indications ALT, VS and FPA, respectively. The user is able to select any one of the sections in order to activate control of that target parameter. In FIG. 3A, the active target parameter is altitude. In FIG. 3B, the active target parameter is vertical speed. In FIG. 3C, the active target parameter is flight path angle. The rotatable element 202 may be turned in order to increase or decrease a value of the target parameter. The value is shown on the first display device 110B or the second display device 110A, in embodiments. The rotatable knob 210 may be additionally actuated by pushing in order to execute the selected target value. That is, the value set through the rotatable knob 210 is sent to the autopilot system 402 (possibly via the flight director 116 or the flight management system 114), but may not be implemented (engaged) until the additional actuation. Implementation may be performed by commanding servo actuators 420. In one embodiment, constant-rate climbs or descents are performed when the vertical speed mode is selected (by touch selecting the VS section of the touch control display 204) at the vertical speed entered by rotating the rotatable element 202. In another embodiment, the flight director 116 maintains a barometric altitude, or is in a phase to attain the altitude target, that has been assigned by rotation of the rotatable element 202 when the altitude mode is selected by pressing the ALT section of the touch control display 204.

In embodiments, one or more of the controllable target parameters are associated with additional selection options. That is, once the target parameter has been touch selected, a swiping action (e.g. left or right) can be used to select one of a plurality of additional controllable aspects of the target parameter. The graphical presentation on the touch control display 204 includes a graphical indication 214A, 214B of the additional controllable aspects. The graphical presentation is adjusted to highlight the indication 214A, 214B of the additional controllable aspect depending on the swipe direction. The processor 404 receives the selection of the additional controllable aspect and controls the target parameter in a different way depending on the selected additional controllable aspect.

Referring to FIG. 3A, the additional controllable aspect is a step size of the target parameter for each indexed rotation of the rotatable element 202 (e.g. altitude steps of 100 or 1000 feet). Although shown with respect to altitude in the present example, this feature could be applied to other target parameters. When a swipe is performed on the touch control display 204, the indication 214A, 214B of the altitude step size is highlighted depending on the selection made by swipe direction. Referring to FIG. 3C, the additional controllable aspects define whether rotation of the rotatable element 202 will adjust either flight path angle target or to only adjust a visual aid of a flight path reference line. A corresponding graphical indication 214A, 214B of the additional controllable aspects is provided (e.g. FPA or FPR Line), which is highlighted depending on the selection made by direction of swipe.

Figure 4A:
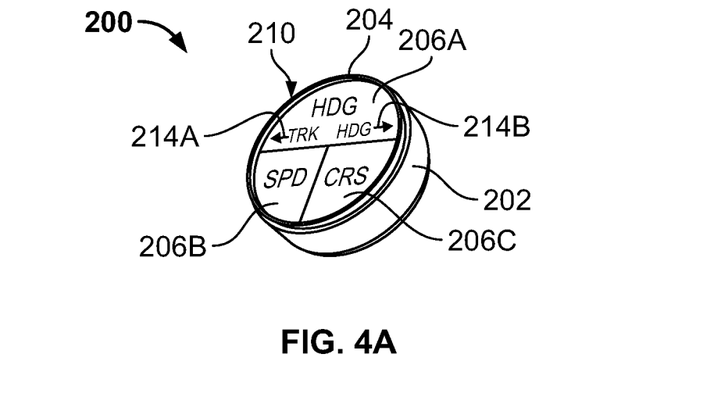
FIGS. 4A to 4C illustrate a flight guidance controller interface, in accordance with various embodiments.
Figure 4B:
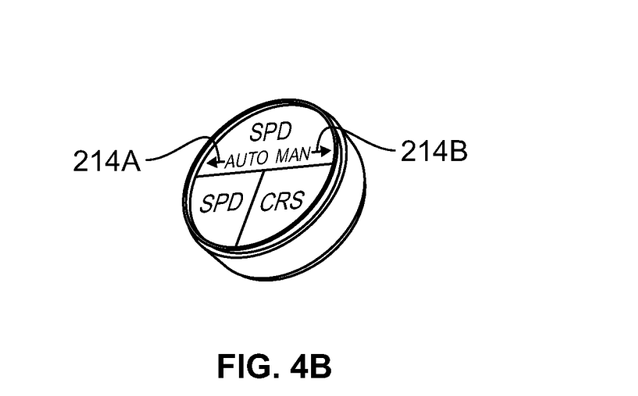
Figure 4C:
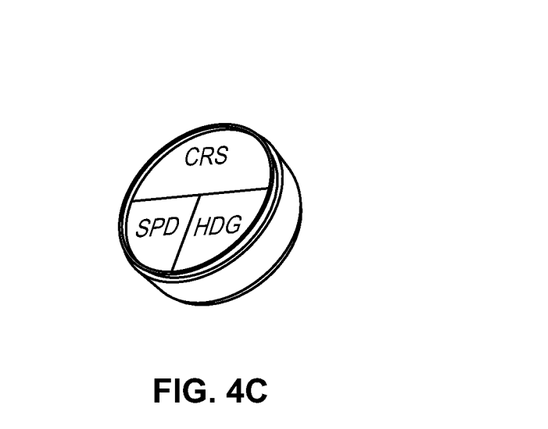

FIGS. 4A to 4C illustrate a flight guidance controller interface 200, in accordance with another embodiment. The flight guidance controller interface is for lateral and speed control. In an exemplary cockpit 102, the input device 112 includes one or both of the flight guidance controllers 200 of FIGS. 3A to 3C and 4A to 4C. The flight guidance controller 200 of FIGS. 4A to 4C includes graphical indications in each section 206A, 206B and 206C corresponding to different functions (or modes or target parameters) of the automatic flight control systems, specifically heading (indicated by HDG), speed (indicated by SPD) and course (indicated by CRS). A user is able to select any one of the sections 206A, 206B, 206C in order to activate control of that function (e.g. in order to select a mode of the autopilot system 402A). The indication of the activated function is placed in the upper section 206A. In FIG. 4A, the activated function is heading mode. In FIG. 4B, the activated function is speed mode. In FIG. 4C, the activated function is course mode.

In the heading mode, the rotatable element 202 is turned to select a new target heading value. The new heading target is displayed by the first or second display devices 110A, 110B. The new heading is confirmed by an additional push activation of the rotatable knob 210. The autopilot system 402A or the flight director 116 receives a sensed signal representing the rotation of the rotatable element 202, determines which control movements are necessary (e.g., left or right turn), computes respective flight director commands and consequently servo actuator commands and sends an output to the servo actuators 420 to fly the new heading. In the course mode, the rotatable element 202 is turned to select a target course value, which is displayed to the crew by one of the display devices 110A, 110B and is used as supporting information during approach phase of flight by the flight director 116. In the speed mode, the rotatable element 202 is turned to select a target speed value, which is displayed and implemented by the automatic flight control system 402.

FIGS. 4A and 4B further illustrate the graphical presentation indicating additional controllable aspects of the activated control mode of the automatic flight control system, in accordance with various exemplary embodiments. In FIG. 4A, the activated control selection is heading and an indication 212A, 212B is provided of tracking or heading to select direction reference, which then result in respective Heading HDG or Track TRK modes and/or target reference values. That is, depending on the direction of swiping (e.g. left or right), the aircraft direction reference will be changed from heading to track, which are respectively indicated with HDG and TRK. The selected additional controllable aspect is highlighted, e.g. by coloring or other graphical emphasis. In FIG. 4B, the additional controllable aspects of the speed mode are the source of speed data. The indication 212A, 212B of these additional controllable aspects include the lettering MAN and AUTO, which represent manually entered speed and automatically computed speeds by the flight management system 114. In one direction of swiping (e.g. right), the source of the speed target value is automatically computed speeds from the flight management system 114 and in the opposite direction (e.g. left) the source of the speed target value is manually, pilot entered speeds. If manual is selected, turning the rotatable knob 210 will adjust manual, pilot entered speed. If auto is selected, turning the rotatable knob 210 will cause temporary flight management system 114 speed intervention.

Figure 5:
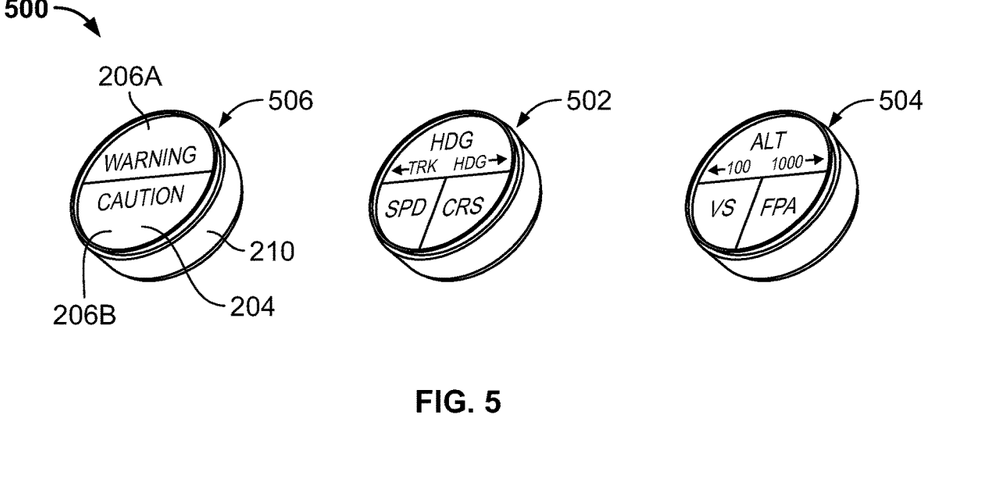
FIG. 5 illustrates a set of flight guidance controller interfaces, in accordance with various embodiments.

FIG. 5 illustrates an exemplary set 500 of rotatable knobs 502, 504, 506 that could be implemented as the input devices 112 in the cockpit 102, in accordance with an exemplary embodiment. FIG. 5 provides a flight guidance controller interface 500 for controlling of all aircraft axes and utilization of the same controller hardware unit for crew alert message acknowledgement and scrolling. A first rotatable knob 502 is according to that described with reference to FIGS. 4A to 4C. A second rotatable knob 504 is according to that described with reference to FIGS. 3A to 3C. A third rotatable knob 506 is structurally the same as the rotatable knobs 210 previously described herein and thus includes a rotatable element 210 and a touch control display 204 mounted fittingly within the rotatable element 210. The processor 404 generates a graphical presentation that is divided into the upper section 206A and the lower section 206B. The rotatable knob 506 provides a graphical presentation of an indication of warning alerts and caution alerts in a respective one of the sections 206A, 206B. The indication of warning alerts and caution alerts may only be for currently active and pilot not-acknowledged alerts in some embodiments. An avionics alerting system will generate alerts. Some alerts are designed such that pilots need to acknowledge them to cancel aural annunciation in the cockpit 102. The touch elements 206A, 206B act as acknowledgement buttons. Knob 210 allows an operator to scroll through the list of all active alert messages displayed on display devices 110A or 110B and produced by the avionics alert system. Scrolling alert messages are displayed on the first or the second display device 110A, 110B depending on the rotation position of the rotatable element 210. Touching 206A or 206B sends an acknowledgement of the alert to an avionics alerting system.

With continued reference to FIG. 5, the pilot is shown master caution or master warning alert messages in the cockpit 102 through the second display device 110A (for example). The rotatable knob 506 graphically presents the upper and lower sections 206A, 206B of the touch control display 204 corresponding to warning and caution alerts. If a new master warning crew alert message is displayed, the upper section 206A of the rotatable knob 506 would start pulsing (or otherwise being highlighted) indicating that there is a new, not acknowledged warning crew alert message. Tapping on this upper section 206A of the rotatable knob 506 would acknowledge this new crew alert message. The same concept would apply to caution crew alert messages just with the lower portion 206B of the rotatable knob 204.

Rotating the rotatable element 210 scrolls through the list of warning or caution crew alert messages for the activated warning or caution section.

It should be appreciated that the input of the target value by a rotatable knob 210 can be interpreted by the automatic flight control system in one of a number of ways including: the target value being actively tracked or controlled towards, the target value being preset but not tracked, and the target value that autoflight presently disregards. The touch control selects a reference (target value) to be changed or preset and the rotatable element changes a value of the target value. In embodiments, the rotatable knob 210 includes an internal processor that generates the presentation for the touch control display 204. The internal processor also outputs information to automatic flight control systems concerning touch selections and magnitude (e.g. number of clicks) and direction of turning of the rotatable element 202. This information is used by automatic flight control system to compute the target value. In other embodiments, further computation is performed by the internal processor and the actual target value is received by the automatic flight control system.

Figure 6:
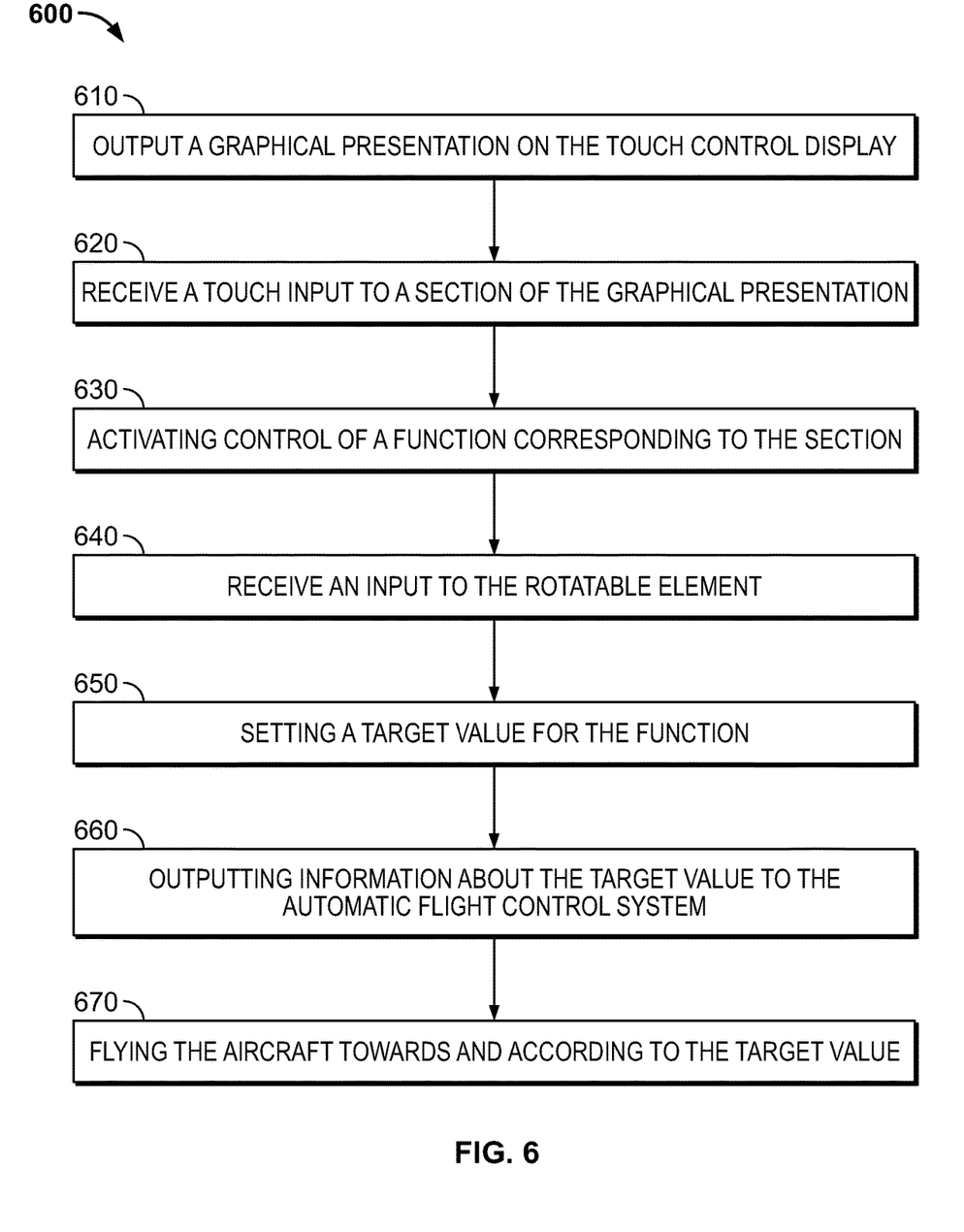
FIG. 6 is flowchart of a method of using a flight guidance controller interface to set a target value of an automatic flight control system, in accordance with various embodiments.

FIG. 6 illustrates a flowchart of a method 600 for setting a target value of an automatic flight control system of an aircraft 100, in accordance with various exemplary embodiments. The various tasks performed in connection with method 600 may be performed by software (e.g. the program instructions 408) executed by the one or more of the processors 404, hardware, firmware, or any combination thereof. For illustrative purposes, the following description of method 600 may refer to elements mentioned above in connection with FIGS. 1 to 5. It should be appreciated that method 600 may include any number of additional or alternative tasks, the tasks shown in FIG. 6 need not be performed in the illustrated order, and method 600 may be incorporated into a more comprehensive procedure or process having additional functionality not described in detail herein. Moreover, one or more of the tasks shown in FIG. 6 could be omitted from an embodiment of the method 600 as long as the intended overall functionality remains intact.

In embodiments, the method 600 includes a step 610 of outputting a graphical presentation on the touch control display 204. The graphical presentation includes the plurality of sections 206A to 206C that are divided by graphical delineations 212A, 212B. The plurality of sections includes an indication (e.g. a graphical textual indication) of the function of the automatic flight control system that can be selected for control. In embodiments, the method 600 includes a step 620 of receiving a touch input to one of the plurality of sections 206A to 206C. A signal corresponding to the touch input is received by the processor 404 and represents a user selection of a function (or mode or target parameter) of the automatic flight control system. In embodiments, the method 600 includes a step 630 of activating control of the selected function, i.e. activating control of the function associated with the touch selected one of the sections 206A to 206C.

In embodiments, the method 600 includes a step 640 of receiving an input to the rotatable element 202 of the rotatable knob 210. In some embodiments, a changing value of a target parameter corresponding to the touch selected function is displayed on a display device of the cockpit 102 (e.g. the first or second display devices 110A, 110B) based on the rotation of the rotatable element 202. The touch selected function or mode may be an altitude mode, a vertical speed mode, a flight path angle mode, a heading mode, a speed mode, a course mode, etc. and the target parameter may be altitude, vertical speed, flight path angle, heading, peed, course, etc. In embodiments, the method 600 includes a step 650 of setting a target value for the function according to the value selected by the rotated position of the rotatable knob 210. The target value may be set implicitly merely by turning the rotatable knob to a selected position. Alternatively, the value may be set by a confirmation input, which may be performed by pushing or depressing the rotatable knob 210 in one or more directions. In embodiments, the method 600 includes a step 660 of outputting the target value to a designated automatic flight control system such as the autopilot system 402A, the flight director 116 or the flight management system 114. In embodiments, the method 600 includes a step 670 of flying the aircraft 100 based on the set target value. Step 670 may include the autopilot system 402A issuing commands to the servo actuators 420 or other actuators so as to control propulsion, steering or braking of the aircraft 100 in order to acquire track and maintain the set target value. For example, the autopilot system 402A may maintain a target altitude, vertical speed, flight path angle, heading direction, speed, course, etc.

In further embodiments, the method may include an additional step of providing an indication 214A, 214B, in the graphical presentation, of additional controllable aspects associated with a selected one of the functions (selected according to step 620). These additional controllable aspects may be touch selected, e.g. by a user swiping towards the respective indication.

In embodiments, the method 600 includes repeating steps 620 to 670 when the function to be controlled is desired to be changed, such as changing from an altitude mode to a vertical speed mode by touch selecting the VS section. In other embodiments, the method includes generating the graphical presentation so that the currently active (touch selected) function is placed in the upper section 206A (with a corresponding reposition of the one or more other indications of functions in the one or more lower sections 206B, 206C).

Further, and with reference to FIG. 5, the method 600 includes providing an indication of warning and caution alerts on the touch control display 204 and allowing acknowledgement thereof by, for example, pushing the rotatable knob 506 in a certain direction. The warning and caution messages associated with the alerts can be selectively displayed on a display of the cockpit 102 by rotating the rotatable element 210 of the rotatable knob 506.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight guidance controller system, comprising:
a flight guidance controller interface including a rotatable knob including a rotatable element disposed around a periphery of a touch control display;
at least one processor in operable communication with the flight guidance controller interface, the at least one processor configured to execute program instructions, wherein the program instructions are configured to cause the at least one processor to:
output a display on the touch control display including a plurality of sections, the plurality of sections including an indication of respective functions of an automatic flight control system;
receive a touch input to one of the plurality of sections, thereby activating control of a corresponding one of the respective functions of the automatic flight control system;
receive a rotation input to the rotatable element, which provides information about a value for the corresponding one of the respective functions of the automatic flight control system; and
output the information to the automatic flight control system so that the automatic flight control system can responsively set the corresponding one of the respective functions based on the value.

2. The flight guidance controller system of claim 1, wherein the rotatable element is rotatable relative to the touch control display.

3. The flight guidance controller system of claim 1, wherein the value for the corresponding one of the respective functions is a target value.

4. The flight guidance controller system of claim 1, wherein the functions of the automatic flight control system include at least one of: heading, airspeed, course, flight path angle, vertical speed, altitude, and automatic flight control system mode, or target reference.

5. The flight guidance controller system of claim 1, wherein the rotatable knob has indexed positions distributed evenly throughout 360° of rotation.

6. The flight guidance controller system of claim 5, wherein the program instructions are configured to cause the at least one processor to:
receive a swipe input to the touch control display; and
change a step size of the value per indexed position based on the swipe input.

7. The flight guidance controller system of claim 1, wherein the plurality of sections includes an upper section and first and second lower sections, and wherein the program instructions are configured to cause the at least one processor to:
output an indication of a first function of the automatic flight control system in the first lower section and output an indication of a second function of the automatic flight control system in the second lower section;

receive a touch input to one of the first and second lower sections, thereby activating control of a corresponding one of the first and second functions of the automatic flight control system;

in response to the touch input to the one of the first and second lower sections:

cause to be displayed the indication of the corresponding one of the first and second functions in the upper section; and receive a rotation input to the rotatable knob, which provides a value for the corresponding one of the first and second functions of the automatic flight control system; and output the value to the automatic flight control system so that the automatic flight control system can responsively set the corresponding one of the first and second functions to the value.

8. The flight guidance controller system of claim 7, wherein the first function and the second function are selected from altitude, vertical speed, flight path angle, heading, course and speed.

9. The flight guidance controller system of claim 1, wherein the touch control display is disc shaped.

10. The flight guidance controller system of claim 9, wherein the rotatable element is ring shaped and receives the disc shaped touch control display therein.

11. A method of setting a target value of an automatic flight control system of an aircraft, the method comprising:

outputting a graphical presentation on a touch control display of a flight guidance controller interface, wherein the flight guidance controller includes a rotatable knob including a rotatable element disposed around a periphery of the touch control display, the graphical presentation including a plurality of sections, the plurality of sections including an indication of respective functions of an automatic flight control system;

receiving, via at least one processor, a touch input to one of the plurality of sections;

in response to the touch input to one of the plurality of sections, activating, via the at least one processor, control of a corresponding one of the respective functions of the automatic flight control system;

receiving, via the at least one processor, a rotation input to the rotatable element;

in response to the rotation input to the rotatable element, providing, via the at least one processor, information about a target value for the corresponding one of the respective functions of the automatic flight control system; and outputting, via the at least one processor, the information about the target value to the automatic flight control system;

flying the aircraft, via the automatic flight control system, using the target value for the corresponding one of the respective functions.

12. The method of claim 11, wherein the rotatable element is rotatable relative to the touch control display.

13. The method of claim 11, wherein the functions of the automatic flight control system include at least one of: heading, airspeed, course, flight path angle, vertical speed, altitude and mode of the automatic flight control system.

14. The method of claim 11, wherein the rotatable knob has indexed positions distributed evenly throughout 360° of rotation.

15. The method of claim 14, comprising:

receiving, via the at least one processor, a swipe input to the touch control display; and changing, via the at least one processor, a step size of the target value per indexed position based on the swipe input.

16. The method of claim 11, wherein the plurality of sections includes an upper section and first and second lower sections, the method comprising:

outputting the graphical presentation including an indication of a first function of the automatic flight control system in the first lower section and an indication of a second function of the automatic flight control system in the second lower section;

receiving, via the at least one processor, a touch input to one of the first and second lower sections;

in response to the touch input to the one of the first and second lower sections:

activating, via the at least one processor, control of a corresponding one of the first and second functions of the automatic flight control system; and displaying, via the at least one processor, the indication of the corresponding one of the first and second functions in the upper section;

receiving, via the at least one processor, a rotation input to the rotatable knob;

providing, via the at least one processor, information about a target value for the corresponding one of the first and second functions of the automatic flight control system based on the rotation input of the rotatable knob;

outputting, via the at least one processor, the information about the target value to the automatic flight control system; and flying the aircraft, via the automatic flight control system, using the target value for the corresponding one of the respective functions.

17. The method of claim 16, wherein the first function and the second function are selected from altitude, vertical speed, flight path angle, heading, course and speed.

18. The method of claim 11, wherein the touch control display is disc shaped.

19. The method of claim 11, wherein the rotatable element is ring shaped and receives the disc shaped touch control display therein.

20. The method of claim 11, comprising receiving, via the at least one processor, a touch input to a first of the plurality of sections;

in response to the touch input to the first of the plurality of sections, activating, via the at least one processor, control of a first of the respective functions of the automatic flight control system;

receiving, via the at least one processor, a first rotation input to the rotatable knob;

in response to the first rotation input to the rotatable input, providing, via the at least one processor, information about a first target value for the first of the respective functions of the automatic flight control system; and receiving, via at least one processor, a touch input to a second of the plurality of sections;

in response to the touch input to the second of the plurality of sections, activating, via the at least one processor, control of a second of the respective functions of the automatic flight control system;

receiving, via the at least one processor, a second rotation input to the rotatable knob;

in response to the second rotation input to the rotatable input, providing, via the at least one processor, information about a second target value for the second of the respective functions of the automatic flight control system outputting, via the at least one processor, the information about the first and second target values to the automatic flight control system;

flying the aircraft, via the automatic flight control system, using the first and second target values for the first and second functions.

\* \* \* \* \*